United States Patent [19]
Gotze et al.

[11] 3,866,864
[45] Feb. 18, 1975

[54] MOUNTING ARRANGEMENT

[75] Inventors: Christian Götze, Munchen; Friedrich Hujer, Grunwald, both of Germany

[73] Assignee: Agfa-Gevaert Aktiengesellschaft, Leverkusen, Germany

[22] Filed: Sept. 20, 1973

[21] Appl. No.: 399,059

[30] Foreign Application Priority Data
Sept. 22, 1972 Germany............................ 2246523

[52] U.S. Cl.......................... 248/1, 248/11, 248/16, 248/124
[51] Int. Cl............................................. A47g 29/00
[58] Field of Search.................... 312/135, 136, 305; 211/163, 169; 248/1, 11, 14, 16, 121, 122, 124, 131, 133.2, 289, 248, 354 R; 355/18, 21, 133; 354/81, 174, 293

[56] References Cited
UNITED STATES PATENTS

| | | | |
|---|---|---|---|
| 1,448,664 | 3/1923 | Hull | 40/68 |
| 3,072,784 | 1/1963 | Mann | 248/354 R |
| 3,727,532 | 4/1973 | Gregory | 354/81 X |

*Primary Examiner*—James C. Mitchell
*Attorney, Agent, or Firm*—Michael S. Striker

[57] ABSTRACT

A mounting arrangement is disclosed for components the relative orientation of which is to be maintained. A frame, subject to flexural deformation under the influence of external forces carries a substantially rigid carrier on which the components are mounted, and journals are provided which journal the carrier in the frame with freedom of pivotable displacement relative to the latter.

11 Claims, 2 Drawing Figures

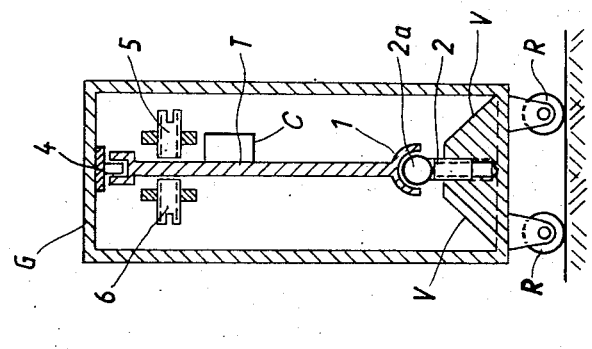
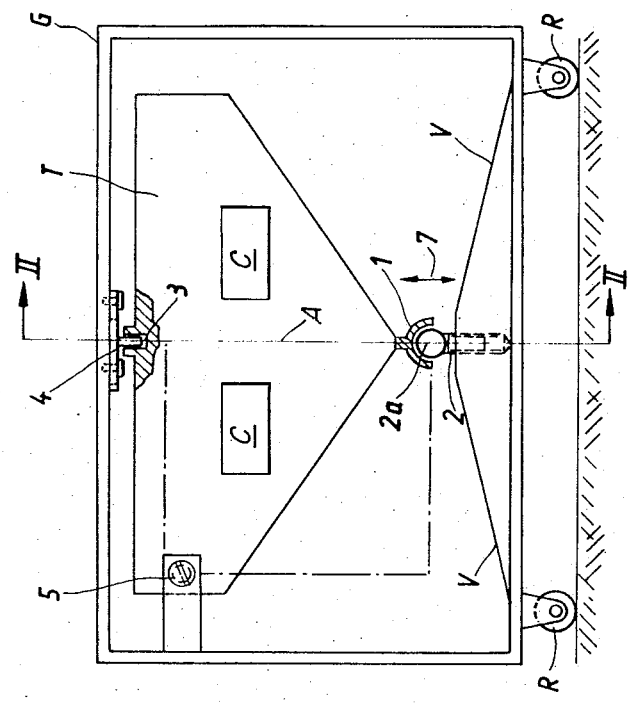

MOUNTING ARRANGEMENT

BACKGROUND OF THE INVENTION

The present invention relates generally to a mounting arrangement, and more particularly to a mounting arrangement for components whose relative orientation is to be maintained.

Specifically, the invention relates to a mounting arrangement of the type mentioned above, which is especially suitable — although not exclusively so — for mounting of components of a photographic roll copier.

There are applications, and the construction of a photographic roll copier is one of them, where components must be mounted in such a manner that they maintain their originally selected relative orientation under all circumstances. For instance, photographic roll copiers use mechanical and optical components which must be so mounted. This type of device, with reference to which the invention will hereafter be described by way of example, heretofore has utilized a relatively rigid frame, in which the sensitive precisely mounted components (e.g., the paper guiding components, the optical components and the film guiding components) were mounted in precise relative orientation. The purpose of making the frame rigid and, therefore, also heavy, was to assure that external forces acting upon the frame would not or only very little change the relative orientation of these components to one another.

The problem with these prior-art constructions is that in order to make the frame rigid enough, it must be strong and heavy, and as a result the overall construction of such devices heretofore has been unduly heavy. Moreover, despite this the prior-art devices still required re-adjustment of the components with reference to one another, at least from time to time, for instance if the device was moved from one place to another, because external forces acting upon the frame did indeed manage to change the orientation of these components.

SUMMARY OF THE INVENTION

Accordingly, it is a general object of the present invention to overcome the disadvantages of the prior art.

More particularly, it is an object of the present invention to provide an improved mounting arrangement for components whose relative orientation is to be maintained.

Still more particularly, it is an object of the present invention, to provide such an improved mounting arrangement which is especially, although not exclusively suitable for use with photographic roll copiers.

Another object of the invention is to provide such an arrangement which permits the use of a relatively light-weight and not so rigid frame, and in which nevertheless the relative orientation of the components will not be disadvantageously influenced by this factor.

In keeping with these objects and with others which will become apparent hereafter, one feature of the invention resides in a mounting arrangement for components whose relative orientation is to be maintained, particularly for components of a photographic roll copier, which comprises a frame subject to flexural deformation under the influence of external forces, and a substantially rigid carrier for the components whose relative orientation is to be maintained. Journalling means journals the carrier in the frame with freedom of pivotable displacement relative to the same. Advantageously the carrier is mounted in two vertically spaced pivots which define for it an upright or vertical pivot axis. It is also advantageous if this axis passes through the center of gravity of the carrier on which the components are mounted, that is the center of gravity is determined after the components have been mounted on the carrier.

In this construction the weight of the carrier and the components mounted thereon rests on the lowermost one of the journals. For this reason, the upper journal can be constructed as a pin and socket journal which is adjustable in horizontal direction, and the lower journal is constructed as a vertically adjustable ball and socket journal.

With this construction, the carrier can be turned about its vertical pivot axis, until it has assumed the desired orientation with reference to the frame. Moreover, it is advantageous to provide suitable limiting means, for instance screws or the like, which limit the turning movement or pivoting movement about the axis, and which can be used to arrest the carrier in a desired position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a diagrammatic vertical longitudinal section through an embodiment of the present invention; and FIG. 2 is a section taken on line II—II of FIG. 1.

DESCRIPTION OF THE PREFERRED EMBODIMENTS

Discussing FIGS. 1 and 2 in detail it will be seen that reference character G identifies a frame of the device. This frame is subject to flexural deformation under the influence of external forces, for instance when it is moved from one location to another or for other reasons. Heretofore, the components whose relative orientation was to be maintained were mounted directly in the frame and any flexural deformation of the frame was transmitted to the components.

This is avoided in accordance with the present invention by providing a carrier T of substantially plate-shaped configuration (it could of course have a different shape), which is mounted for pivoting movement about an axis with reference to the frame G. Two journals are provided, a journal 1, 2 and a journal 3, 4, which are spaced from one another in direction of the pivot axis. In the illustrated embodiment the pivot axis is designated with reference character A, and has an upright or vertical orientation, although this is not absolutely necessary. The axis A passes at least approximately through the center of gravity of the carrier T and preferably the center of gravity is determined after the components C, which have been shown only in diagrammatic form in the way of phantom lines, have been mounted on the carrier T.

The journals for the carrier T, namely the pin and socket journal 3,4 and the ball and socket journal 1,2, are spaced from one another along the axis A. The upper of the journals is the pin and socket journal having the pin 4 which in the illustrated embodiment is provided on the frame G, and a socket in the carrier T into which the pin 4 extends, the socket being designated with reference numeral 3. The pin 4 can be adjusted in horizontal direction (either towards the left or towards the right in FIG. 1) by a certain amount, so that it can be moved until it is precisely above the journal 1,2. For instance, the pin could have a screw threaded portion extending through a slot in the frame G, and nuts on this portion and which can be tightened against the frame on opposite sides of the latter, or another suitable arrangement could be provided for the adjusting purposes.

The journal 1,2 has a socket 1 and a ball member 2, the former being provided on the carrier T and the latter on the frame G. The ball portion 2a of the member 2 is received in the socket 1. The double-headed arrow 7 in FIG. 1 indicates that the member 2 with the portion 2a can be moved up and down with reference to the frame G, and again a screw threaded connection can be utilized for this purpose.

The components C have been diagrammatically illustrated as being mounted on the carrier T, and they may for instance be paper guiding elements, optical elements and film guiding elements.

For reasons of stability the carrier T may be constructed as a casting frame and the frame G may be a tubular frame which is welded together.

The weight of the carrier T with the components C thereon is supported by the ball portion 2a and is transmitted via braces V to the frame G and from there advantageously to the rollers R or to stationary supports for the frame.

Limiting devices, here illustrated as screws 5 and 6 provided on the frame G, are provided for preventing a turning of the carrier T about the axis A out of the position which has been selected for it relative to the frame G.

The construction disclosed herein assures that the carrier T is mounted in the frame G without any stresses transmitted to it and without any flexural deformation of the frame G being transmitted to the components C and being able to influence their relative orientation. Because an adjustment of the carrier T with reference to the frame G can be carried out very readily, via the member 2, and the screw 5,6, the welded frame G need not be manufactured to particularly precise tolerances, and this possibility of manufacturing it to loose tolerances facilitates its production and reduces the expense of manufacturing it.

Despite the fact that the overall weight of the arrangement can be considerably less than heretofore required in similar constructions of the prior art, the transmission of flexural stresses acting upon the frame G (or any housing provided for the same) to the components C on the carrier G is reliably prevented. Because of this the arrangement according to the present invention is much more resistant to disadvantageous influences upon the components C than the prior-art arrangements, despite its lighter-weight construction.

It will be understood that each of the elements described above, or two or more together, may also find a useful application in other types of constructions, differing from the types described above.

While the invention has been illustrated and described as embodied in a mounting arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a photographic roll copier having a plurality of components whose relative orientation is to be fixedly maintained, an improvement in a mounting arrangement for said components comprising a frame which is subject to flexural deformation under the influence of external forces; a substantially rigid carrier for mounting said components in said relative orientation; and journalling means journalling said carrier in said frame with freedom of pivotable displacement relative thereto so as to prevent the transmission of stresses from said frame to said components.

2. A mounting arrangement as defined in claim 1; and further comprising a plurality of components mounted on said carrier in predetermined relative orientation.

3. A mounting arrangement as defined in claim 1, wherein said journalling means journals said carrier for said pivotable displacement about an upright axis, and comprises two journals which are spaced from one another longitudinally of said axis.

4. A mounting arrangement as defined in claim 2, wherein said journalling means journals said carrier for said pivotable displacement about an upright axis which passes through the center of gravity of said carrier having said components mounted thereon, said journalling means comprising two journals which are spaced from one another longitudinally of said axis.

5. A mounting arrangement as defined in claim 2, wherein said journals include one journal having a socket on one and a pivot pin received in said socket and provided on the other of said frame and carrier, and an other journal having a ball on one and a ball socket on the other of said frame and carrier.

6. A mounting arrangement as defined in claim 5, wherein said one journal is the upper one of said journals.

7. A mounting arrangement as defined in claim 5, wherein said one journal is adjustable relative to said frame in horizontal direction, and said other journal is adjustable relative to said frame in vertical direction.

8. A mounting arrangement as defined in claim 3; and further comprising adjustable limiting means for limiting the extent of pivotable displacement of said carrier about said axis.

9. A mounting arrangement as defined in claim 1, wherein said carrier is a plate-shaped member.

10. A mounting arrangement as defined in claim 3, wherein said carrier is a plate-shaped member having a vertical orientation and upper and lower edge portions which are provided with said one and said other journal, respectively.

11. A mounting arrangement for components whose relative orientation is to be fixedly maintained, particularly for components of a photographic roll copier, comprising a frame which is subject to flexural deformation under the influence of external forces; a substantially rigid carrier for mounting said components in a predetermined relative orientation; and means mounting said carrier in said frame with freedom of displacement relative thereto, so as to isolate said components from said frame to thereby prevent the transmission of stresses from said frame to said components.

* * * * *